UNITED STATES PATENT OFFICE.

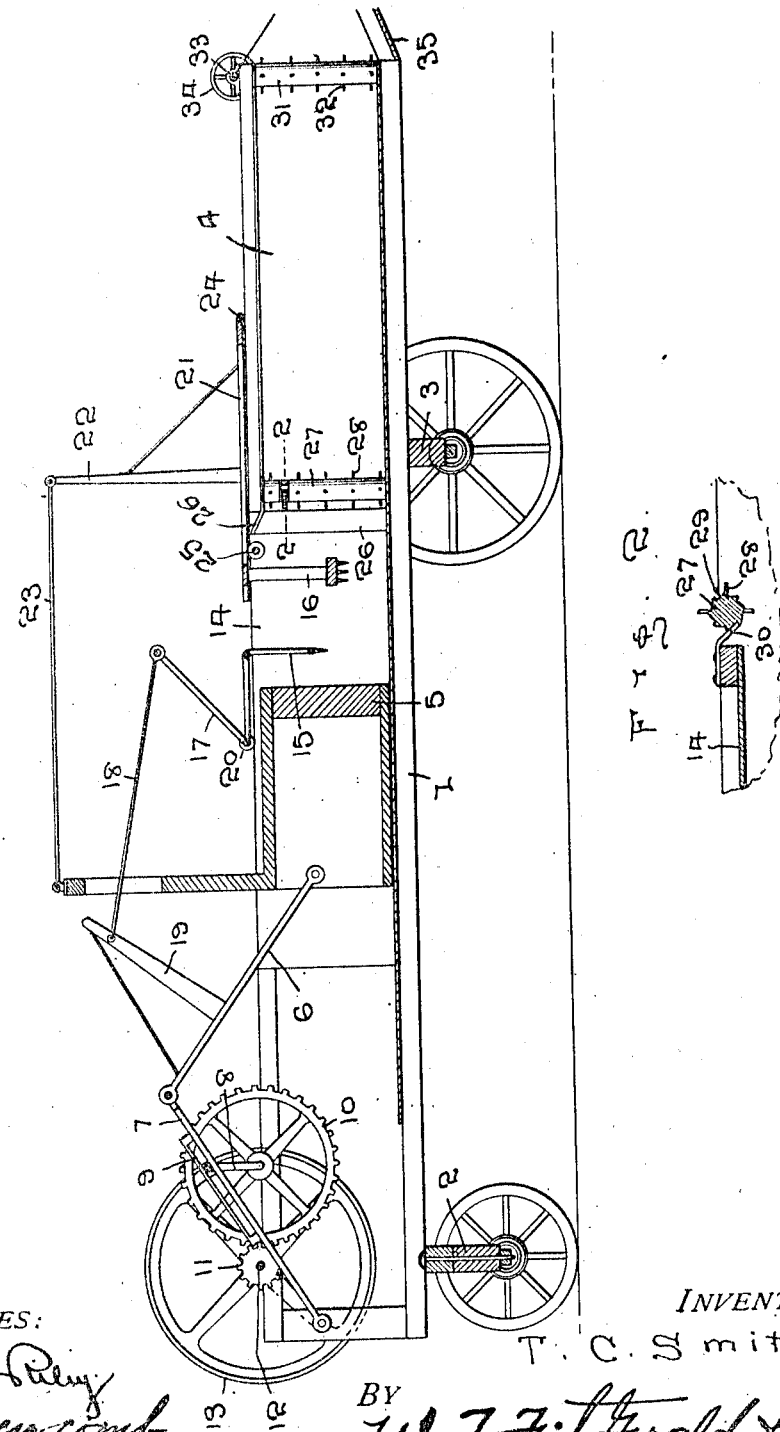

THOMAS CHESLEY SMITH, OF BARDWELL, KENTUCKY.

BALING-PRESS.

978,229.

Specification of Letters Patent.  Patented Dec. 13, 1910.

Application filed July 12, 1910. Serial No. 571,598.

*To all whom it may concern:*

Be it known that I, THOMAS CHESLEY SMITH, a citizen of the United States, residing at Bardwell, in the county of Carlisle and State of Kentucky, have invented certain new and useful Improvements in Baling-Presses; and I do hereby declare the following to be a full, clear, and exact description of the invention, such as will enable others skilled in the art to which it appertains to make and use the same.

My invention relates to new and useful improvements in baling presses and more particularly to that class adapted to be used for baling hay, straw and similar substances and my object is to provide a suitable baling chamber and place therein a plunger, which is adapted to compress hay, etc., in the baling chamber.

A further object is to provide means for operating said plunger.

A further object is to provide feeding mechanisms adapted to force the straw into the path of the plunger.

A further object is to provide means for removing the feeding mechanisms from the path of the plunger, when said plunger is being moved into the chamber.

A further object is to provide means for holding the straw within the chamber, and, A still further object is to provide means for removing the bale of hay from the chamber, when desired.

Other objects and advantages will be hereinafter referred to and more particularly pointed out in the specification hereunto annexed.

In the accompanying drawings which are made a part of this application, Figure 1 is a longitudinal central sectional view through the baling press, and, Fig. 2 is a detail sectional view as seen on line 2—2 Fig. 1.

Referring to the drawings in which similar reference numerals designate corresponding parts throughout the several views, 1 indicates a frame, which is preferably mounted upon a forward and rear truck 2 and 3, whereby the baling press may be moved from place to place. Formed in the frame 1 is a baling chamber 4, into which hay, straw and the like is adapted to be forced to assemble the same into compact form. Slidably mounted in the frame 1 is a plunger 5, which is adapted to force the hay, etc., into the baling chamber, said plunger having a link 6 pivotally attached thereto and to the end of said link is pivotally attached a link 7, the opposite end of the link being in turn pivotally secured to the frame and it will be readily seen that when the link is raised and lowered, the plunger will be moved back and forth in the frame. The link 7 is operated through the medium of a crank 8, said crank extending over the link and through a guide 9 above the link, thus causing the link to travel with the crank. The shaft to which the crank is attached has its ends mounted in suitable bearings (not shown) on the frame and has attached thereto gears 10, with which mesh pinions 11 carried by a driving shaft 12, and to this driving shaft power is applied through the medium of a belt wheel 13 or other suitable means.

The plunger 5 is moved a sufficient distance from the end of the chamber 4 as to leave a recess 14, into which the hay, etc., is deposited before being moved into the baling chamber by the plunger and in order to force the hay into the recess and in front of the plunger, I provide a pair of feeders 15 and 16, the feeder 15 being a substantially L-shaped frame, one portion of which is adapted to normally extend horizontally and the other portion vertically, the vertical portion projecting into the recess 14 and forwardly of the plunger. Attached to the free end of the horizontal portion of the feeder 15 is an auxiliary frame 17, which inclines over the feeder and has attached to the upper bar thereof rods 18, the opposite ends of said rods being attached to a standard 19 carried by the link 6. The end of the horizontal section of the feeder adjacent its connection with the auxiliary frame is pivoted in bearings 20 on the frame 1, so that when the link 6 is moved downwardly to force the plunger into the baling chamber, the vertical portion of the feeder will be swung upwardly and out of the path of the plunger and by swinging the feeder upwardly in this manner, the hay may be deposited on the plunger and without coming in contact with said feeder. The feeder 16 is attached to a rack 21, which is in turn hinged to the frame 1 at a point over the chamber 4, said rack having standards 22 extending upwardly therefrom, the upper ends of the standards being connected to the plunger 5 by means of a link 23. By this construction, it will be readily seen that as the plunger moves forwardly to force the hay into the baling chamber, the rack 21 will be swung upwardly on its hinges 24 and the feeder 16 moved out of the path of the plunger. This operation also moves the feeder 16 out of the way of the hay, as it is being deposited upon the plunger. As the plunger starts on its rearward stroke, both of the feeders are swung downwardly, thus engaging the new supply of hay, which has been deposited upon the plunger and lowers the same into the recess 14 and directly in the path of the plunger.

To prevent the hay from overlapping or catching upon the edge of the baling chamber, as it is being moved into the chamber by the plunger, a roller 25 is extended across the recess 14 adjacent the upper end wall of the baling chamber and to further guard against the hay catching, the mouth of the baling chamber is flared, as shown at 26.

To prevent the hay from moving out of the chamber as the plunger recedes therefrom, rollers 27 are mounted in the side walls of the chamber and adjacent the mouth thereof, said rollers having fingers 28 thereon, which catch the hay and prevent the same from moving out of the chamber. The rollers 27 are held against rotation in one direction by placing ratchet teeth 29 thereon, with which coöperate a spring tongue 30 carried by the frame, thus leaving the rollers 27 free to rotate in one direction and holding the same against rotation in the opposite direction. After the bale has been properly tied together, it is moved out of the chamber through the medium of rollers 31, which are mounted at the end of the chamber opposite the rollers 27, said rollers 31 having prongs 32 thereon, which engage the bale and cause the same to move out of the chamber, when the rollers 31 are rotated. Extending transversely across the chamber 4 is a shaft 33 having gears thereon coöperating with gears on the rollers (not shown), so that when the shaft is rotated through the medium of the hand wheels 34, the rollers 32 will be likewise rotated. The bale after leaving the chamber 4 passes onto an elevator 35, from whence it is conveyed to any suitable point.

In view of the simplicity of this device, it will be readily seen that it can be very cheaply, as well as strongly and durably constructed and will require but a minimum amount of power to operate the same. It will further be seen that the hay will be positively fed into the path of the plunger and in position to enter the baling chamber without leaving portions of the hay to catch upon the edges of the baling chamber and it will further be seen that the hay will be prevented from leaving the chamber when the pressure of the plunger is released therefrom and it will likewise be seen that the bale can be readily removed from the chamber, when desired.

What I claim is:—

1. In a baling press, the combination with a frame having a baling chamber therein, of a plunger slidably mounted in said frame, means to move said plunger into and out of the baling chamber, a standard carried by the plunger operating means, a feeder operated by said standard to force hay into the path of the plunger, an additional feeder hinged to said frame, a standard carried thereby and means to connect said last mentioned standard to the plunger, whereby the movement of said plunger will raise or lower said last mentioned feeder.

2. In a baling press, the combination with a frame having a baling chamber therein, of a plunger slidably mounted in the frame, means to move said plunger toward and from the baling chamber, a pair of opposed feeders pivotally mounted in the frame, means connecting one of said feeders with the plunger, and means connecting the other of said feeders with the plunger operating mechanism, whereby the movement of the plunger will cause said feeders to act simultaneously and force the hay into the path of the plunger with the reverse movement thereof.

3. In a baling press, the combination with a frame having a baling chamber therein, of a plunger slidably mounted in said frame, a toggle operating means for said plunger, a pair of feeders pivotally mounted in the frame, means connecting one of said feeders with the plunger, and means connecting the other of said feeders with the plunger link of the toggle, whereby the movement of the plunger will operate said feeders so as to force hay into the path of the plunger with the reverse movement thereof.

In testimony whereof I have signed my name to this specification in the presence of two subscribing witnesses.

THOMAS CHESLEY SMITH.

Witnesses:
 OSCAR BODKIN,
 J. A. HARTSEL.